Nov. 8, 1955    P. ANTES    2,723,134
TRAILER HITCH
Filed April 23, 1953
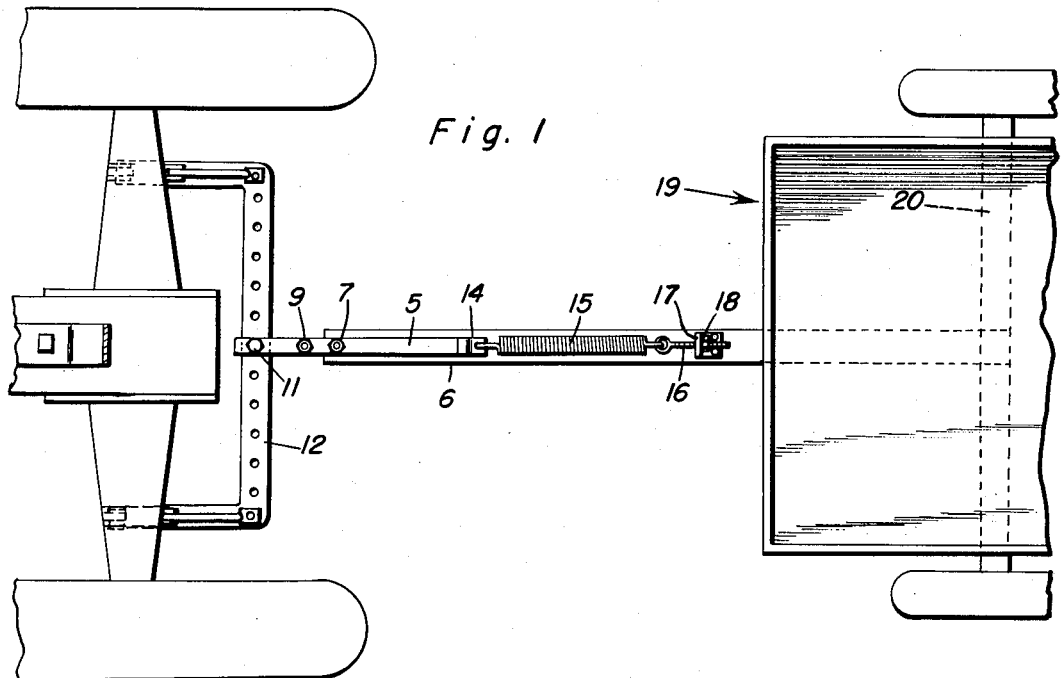
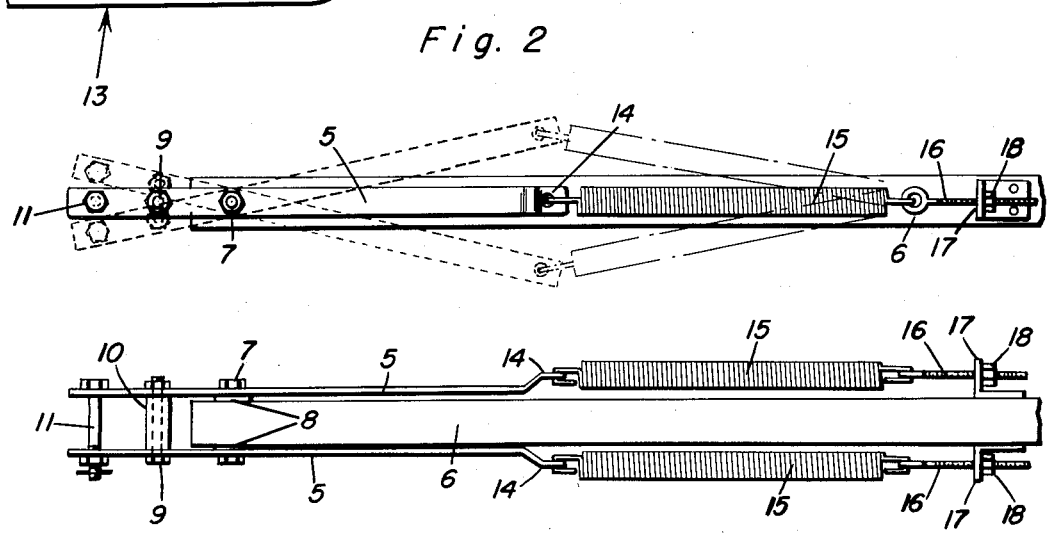
Paul Antes
INVENTOR.

United States Patent Office 2,723,134
Patented Nov. 8, 1955

2,723,134

TRAILER HITCH

Paul Antes, Syracuse, Nebr.

Application April 23, 1953, Serial No. 350,676

1 Claim. (Cl. 280—488)

The present invention relates to new and useful improvements in trailer hitches and has for one of its important objects to provide, in a manner as hereinafter set forth, a device of this character comprising a novel construction and arrangement whereby continuous turns of a relatively short radius may be readily made.

Another very important object of the invention is to provide a hitch of the aforementioned character which will prevent the tongue, axle, etc., of the trailer from being damaged in the event that too short a turn is made.

Other objects of the invention are to provide a trailer hitch of the character described which will be relatively simple in construction, strong, durable, highly efficient and reliable in use, compact and which may be manufactured at low cost.

All of the foregoing and still further objects and advantages of the invention will become apparent from a study of the following specification, taken in connection with the accompanying drawing wherein like characters of reference designate corresponding parts throughout the several views, and wherein:

Figure 1 is a top plan view, showing a hitch embodying the present invention connected to the draw bar of a tractor;

Figure 2 is a plan view of the device, showing its operation in dotted lines; and, Figure 3 is a side elevational view.

Referring now to the drawing in detail, it will be seen that the embodiment of the invention which has been illustrated comprises a pair of substantially duplicate bars 5 of suitable metal. The bars 5 are pivotally mounted for swinging movement in a horizontal plane on the forward or free end portion of a trailer tongue 6 through the medium of a bolt 7. It will be observed that the bars 5 are mounted above and below the tongue 6 and that the pivot bolt 7 passes therethrough at a point forwardly of the longitudinal centers of said bars. Washers 8 are interposed between the bars 5 and the tongue 6 on the pivot bolt 7.

At a point forwardly of the trailer tongue 6, a bolt 9 connects the bars 5. Mounted on the bolt 9 is a spacing sleeve 10 for the bars 5. The forward end portions of the bars 5 are pivotally, adjustably and detachably connected by a bolt or pin 11 to the usual draw bar 12 of a tractor 13.

The bars 5 terminate in vertically offset, apertured rear end portions 14. Coil springs 15 have one end connected to the end portions 14 of the bars 5. Screw eyes or bolts 16 are connected to the other ends of the coil springs 15. The bolts 16 pass slidably through angle brackets 17 on the tongue 6 and have threaded thereon nuts 18 for adjustably anchoring the rear ends of the coil springs 15 to said tongue 6.

It is thought that the manner in which the invention functions will be readily apparent from a consideration of the foregoing. Briefly, when the tractor 13 and the trailer 19 are moving straight or substantially straight ahead the pivotally mounted bars 5 of the hitch are yieldingly held in parallelism with the tongue 6 by the coil springs 15. However, if a left or right hand turn is made which would ordinarily be too short or acute the coil springs 15 allow the hitch bars 5 to swing about the pivot 7 in the manner suggested in dotted lines in Figure 2 of the drawing thereby permitting such a turn to be negotiated without breaking or damaging the trailer tongue 6, the axle 20, etc. The construction and arrangement also is such so as to permit continuous turns to be made in a short radius when desired. Through the medium of the nuts 18 on the eye bolts 16 the tension of the coil springs 15 may be readily adjusted or regulated as desired.

It is believed that the many advantages of a trailer hitch constructed in accordance with the present invention will be readily understood and although a preferred embodiment of the device is as illustrated and described, it is to be understood that changes in the details of construction and in the combination and arrangement of parts may be resorted to which will fall within the scope of the invention as claimed.

What is claimed as new is as follows:

The combination with a trailer tongue, of a hitch comprising a pair of longitudinal bars pivotally mounted, at an intermediate point, on the tongue above and below same and adjacent the free end thereof for swinging movement in a horizontal plane, said bars projecting forwardly beyond the tongue, a coupling pin on the forward end portions of the bars, a bolt detachably connecting the bars adjacent the pin for swinging movement in unison, a spacing sleeve on the bolt between the bars, said bars terminating in vertically offset apertured rear end portions, angular brackets on the tongue in rearwardly spaced relation to the bars, coil springs having one end connected to said rear end portions of the bars, eye bolts connected to the other end portions of the springs and slidably mounted in the brackets, and nuts threaded on the eye bolts and engaged with the brackets for adjustably anchoring the springs to the tongue for yieldingly resisting swinging movement of the bars.

References Cited in the file of this patent

UNITED STATES PATENTS

| | | |
|---|---|---|
| 1,313,452 | Behlen | Aug. 19, 1919 |
| 1,313,453 | Behlen | Aug. 19, 1919 |